UNITED STATES PATENT OFFICE.

JAMES E. SMITH, OF CLINTON, IOWA, ASSIGNOR TO NATIONAL PEAT PRODUCTS & CHEMICAL COMPANY, A CORPORATION OF SOUTH DAKOTA.

GRIT FOR POULTRY.

996,289.      Specification of Letters Patent.      Patented June 27, 1911.

No Drawing.      Application filed December 8, 1906. Serial No. 346,859.

*To all whom it may concern:*

Be it known that I, JAMES E. SMITH, citizen of the United States, residing at Clinton, in the county of Clinton and State of Iowa, have invented a certain new and useful Improvement in Grit for Poultry, of which the following is a full, clear, concise, and exact description.

My invention relates to an improved process of making carbon grit for poultry from peat.

The charcoal used at the present time by poulterers is in the form of charcoal pieces of the desired size, usually formed by breaking up ordinary charcoal. The charcoal in this state, however, is very dirty as it becomes more or less powdered, the result being that this powder finds its way into the feathers of the poultry, and this form of charcoal, therefore, is very uncleanly to use.

The charcoal I produce is obtained from peat and is in the form of pellets or particles, substantially of the size of grain. The pellets, furthermore, are hard and therefore act as grit when eaten by the poultry, and the charcoal being thus in this hard state will not produce dust. The process of obtaining this charcoal is as follows: Peat in its raw state is forced through small openings, as, for instance, through a screen of suitable mesh or through dies, the peat on its passage through the openings being more or less compressed and forming the pellets. These particles or pellets are then transferred to a roasting oven or retort and are subjected to heat whereby the gases are driven from the peat pellets, the residue being in the form of charcoal pellets ready to be fed to poultry. Owing to the compression of the peat upon formation into pellets, the carbon pellets are sufficiently hard to act as grit when eaten by the poultry. Being thus hard the particles resist disintegration and therefore prevent formation of carbon or charcoal dust. At the same time the charcoal pellets retain all their disinfecting qualities.

I claim as follows:

1. The process of obtaining poulterers' carbon and grit from peat which consists in forcing peat in its raw state through small openings so as to compress and form it into pellets, then transferring the pellets thus compressed and formed to a roasting oven and subjecting them to heat until the gases are drawn therefrom and until only charcoal remains.

2. As a product, poultry grit in the form of hard cylindrical pellets of charcoal formed from compressed and carbonized peat.

In witness whereof, I hereunto subscribe my name this 6th day of December A. D., 1906.

JAMES E. SMITH.

Witnesses:
CHARLES J. SCHMIDT,
GEORGE E. HIGHAM.

---

Copies of this patent may be obtained for five cents each, by addressing the "Commissioner of Patents, Washington, D. C."